Sept. 29, 1942.　　　R. B. BOURNE　　　2,297,046
MEANS FOR PREVENTING SHOCK EXCITATION OF ACOUSTIC CONDUITS OR CHAMBERS
Filed Aug. 25, 1939　　　4 Sheets-Sheet 1
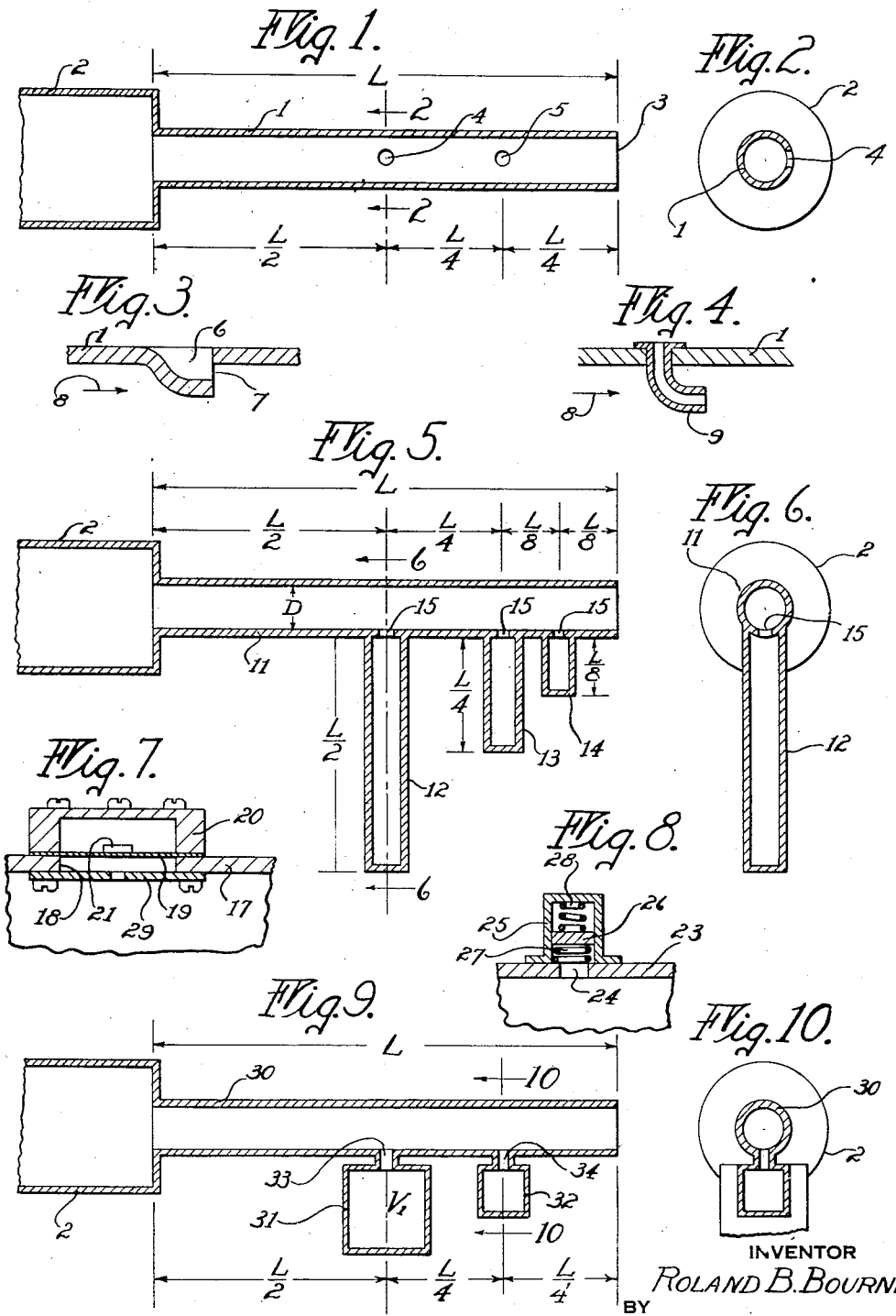
INVENTOR
ROLAND B. BOURNE
BY Chapin & Neal
ATTORNEYS Sept. 29, 1942.  R. B. BOURNE  2,297,046
MEANS FOR PREVENTING SHOCK EXCITATION OF ACOUSTIC CONDUITS OR CHAMBERS
Filed Aug. 25, 1939  4 Sheets-Sheet 2
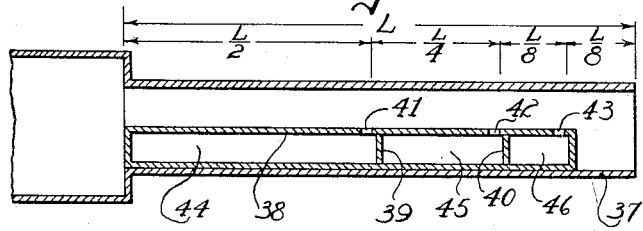
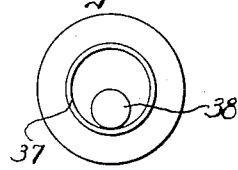
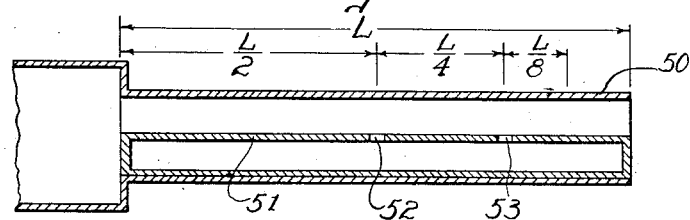
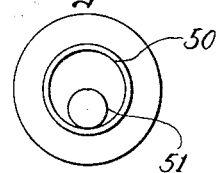
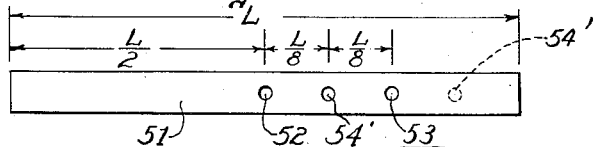
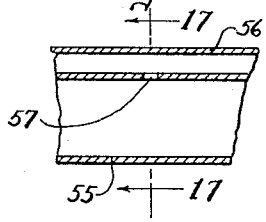
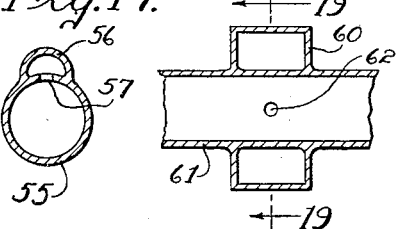
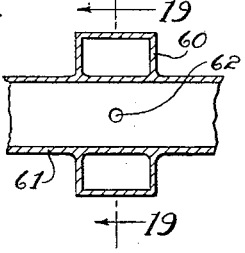
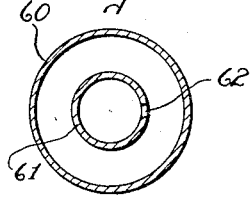
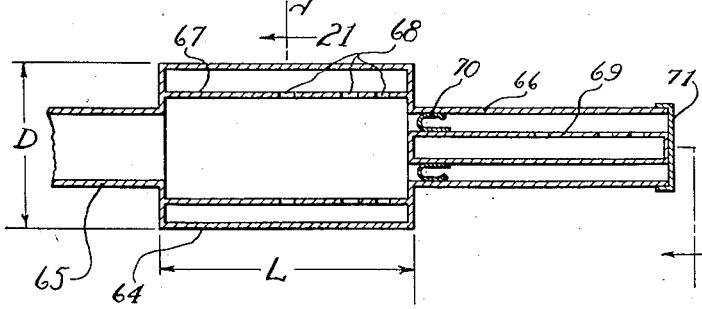
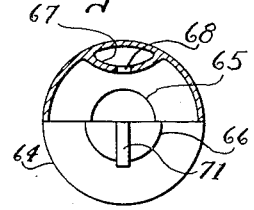
INVENTOR
ROLAND B. BOURNE
BY Chapin + Neal
ATTORNEYS

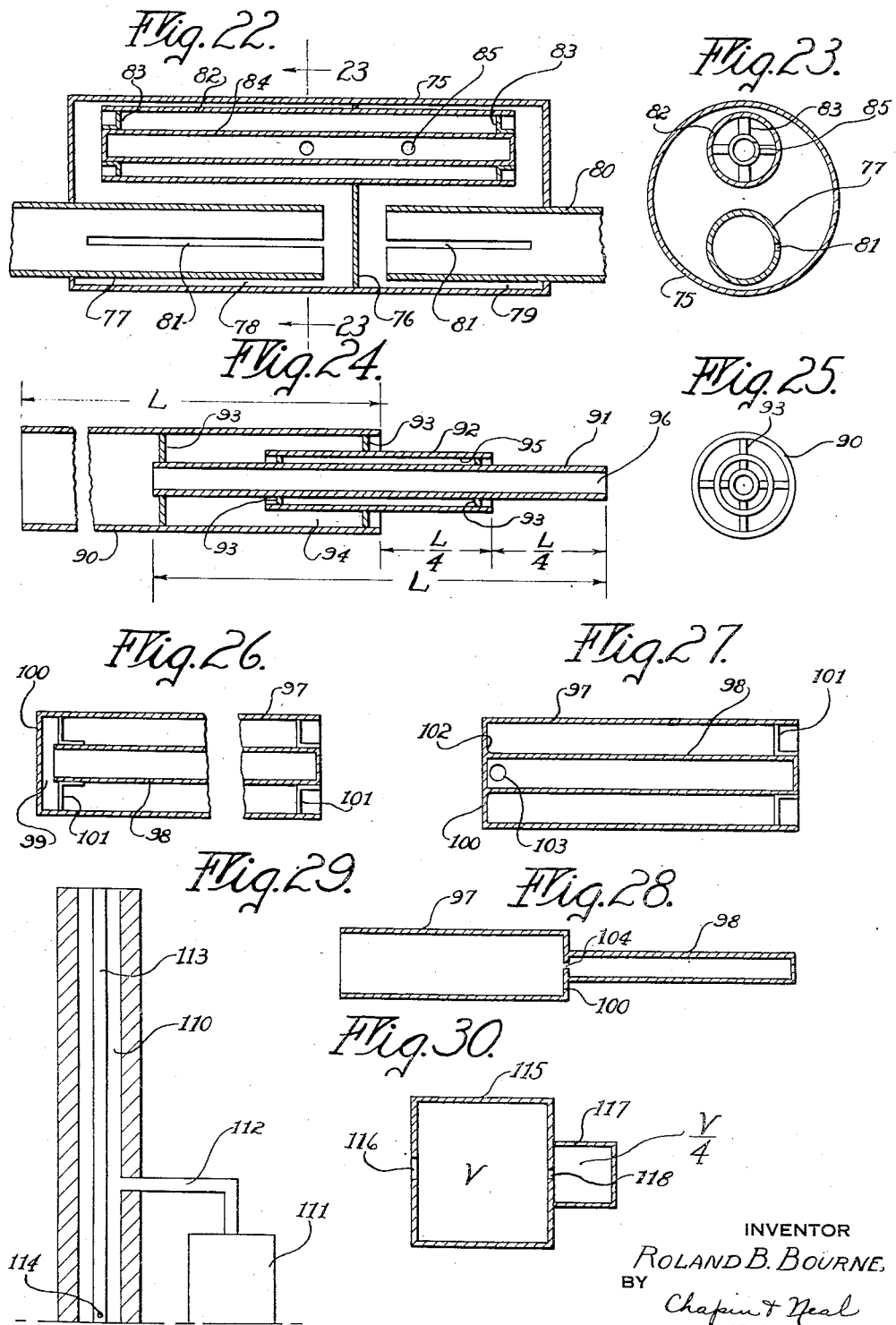

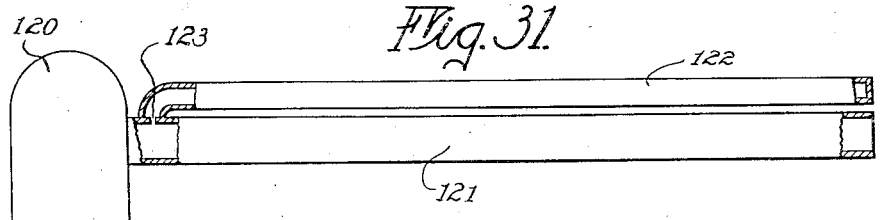
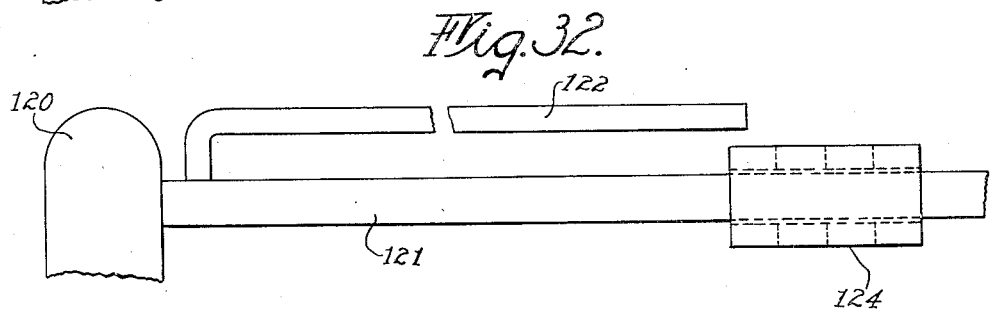
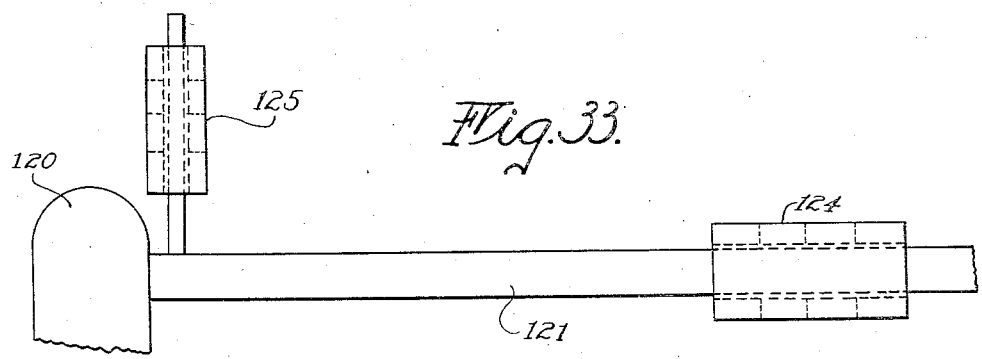
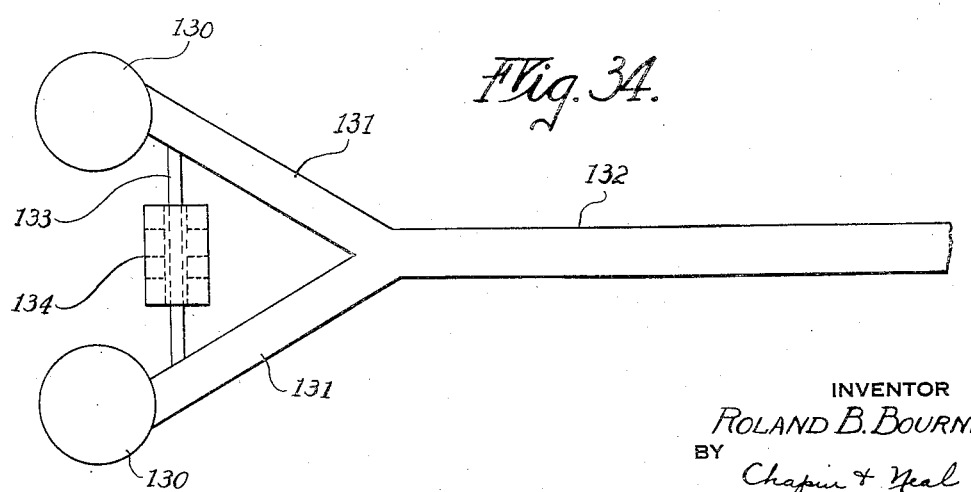

Patented Sept. 29, 1942

2,297,046

UNITED STATES PATENT OFFICE 2,297,046

MEANS FOR PREVENTING SHOCK EXCITATION OF ACOUSTIC CONDUITS OR CHAMBERS

Roland B. Bourne, West Hartford, Conn., assignor to The Maxim Silencer Company, Hartford, Conn., a corporation of Connecticut Application August 25, 1939, Serial No. 291,820

34 Claims. (Cl. 181—48)

The present invention relates to devices for preventing the formation of shock excited standing waves in pipes, chambers and the like.

Most silencing devices are concerned with the suppression of sound waves which are set up by some source such as an internal combustion motor or air compressor. In actual installations it has been found that in spite of the theoretical performance which should be expected from a particular device a considerable sound disturbance has been present having no apparent frequency connection with the exciting source. This type of noise is due to shock excitation of the tail pipe or of some chamber connected with the silencing system. For example, it frequently happens that the tail pipe used to convey the exhaust gases from a muffler to the atmosphere is shock excited by the pulses present in the exhaust gas stream and "sounds off" to a number of frequencies depending upon the shape and dimensions of the tail pipe. It is apparent that, even though the muffler might silence adequately, it can have no effect upon sound waves later produced directly in the tail pipe. Expansion chambers in mufflers are also liable to sound off from the same cause.

The present invention is directed to the treatment of such pipes, conduits or chambers, in such a manner as to render them acoustically dead to shock excitation; so that gas slugs of even great intensity do not create a set of new noises. The invention is thus concerned not with the attenuation of noises as in the ordinary silencing system, but rather with the treatment of the gas conducting system so that it will not itself create sound waves due to shock excitation by a gas pulse or other disturbance which in itself may be soundless.

Expressed rather broadly, the invention consists in coupling very loosely to such a system an auxiliary system which presents substantially zero reactance at said coupling. Such an auxiliary system is presented by the atmosphere when coupled to a tail pipe through apertures therein, or by an acoustic resonator coupled to the pipe at a pressure anti-node for that frequency to which the resonator responds. It is an important feature of this invention that the coupling between the two systems, generally represented by a small diameter hole forming an acoustic conductivity, is sufficiently small so that the addition of the auxiliary system causes substantially no change in the natural resonating frequencies of the main system. If the coupling is increased, the two systems together combine to form a compound system having its own natural periods to which it may be shock excited. From a practical standpoint this requires that the auxiliary system be coupled to the main system so loosely, (that is, through a conductivity so small) that it presents substantially no practical attenuating effect upon impressed sound waves in the main channel and of that frequency for which the location of the auxiliary system was chosen; and does not change substantially the natural frequencies of the main system.

While the auxiliary system is so chosen as to present substantially zero reactance, its effect is to add resistance or damping to the main conduit or cavity to such an extent that the latter can no longer support standing waves at its natural frequency. This differs from the usual case where attenuation is secured by the use of resonators in that in the present case the auxiliary system is not employed to produce reactive interference, but merely to increase the damping of the main system to a point where standing waves can not occur.

The present invention should also be distinguished from cases in which resistance is directly imposed in the main channel. In the present case the effect of a resistance is secured by a reactive system loosely coupled to the main system at points of maximum pressure fluctuation, instead of being secured by sound absorbing material introduced directly into the path of the sound waves at points of greatest velocity fluctuation.

In the case where the damping in the main channel is produced by purely reactive means, the coupled resonator itself should have as low damping as possible in order that the total damping of the system, assuming correct coupling, may be a maximum. It will be apparent that a compound resonator having the proper natural frequency may be used in the place of a simple resonator, although the latter is generally preferred.

Referring to the drawings:

Fig. 1 is a diagrammatic side view of a conduit to which one simple form of the invention has been applied;

Fig. 2 is a section thereof on line 2—2 of Fig. 1;

Fig. 3 is a detail of the conduit wall section on an enlarged scale, illustrating one method of coupling when the auxiliary system is the atmosphere;

Fig. 4 is a detail section similar to Fig. 3 but showing a different form of coupling;

Fig. 5 is a diagrammatic view of a conduit similar to that shown in Fig. 1 in which the auxiliary system consists of simple linear resonators;

Fig. 6 is a section thereof, taken on line 6—6 of Fig. 5;

Figs. 7 and 8 are detail sections of the conduit wall showing two forms of a mechanical auxiliary system;

Fig. 9 is a view similar to Fig. 5 showing the use of volumetric resonators;

Fig. 10 is a section on line 10—10 of Fig. 9;

Fig. 11 is a view similar to Fig. 5 showing a modification;

Fig. 12 is an end view of the device of Fig. 11;

Fig. 13 is a view similar to Fig. 11 showing a further modification;

Fig. 14 is an end view of the device of Fig. 13;

Fig. 15 is a detail showing a further modification;

Fig. 16 is a detail of one manner of mounting a linear resonator externally of the conduit;

Fig. 17 is a section on line 17—17 of Fig. 16;

Fig. 18 is a detail of one manner of mounting a volumetric resonator externally of the conduit;

Fig. 19 is a section on line 19—19 of Fig. 18;

Fig. 20 is a longitudinal section through an expansion chamber and tail pipe treated in accordance with my invention;

Fig. 21 is a section on line 21—21 of Fig. 20;

Fig. 22 is a longitudinal section through one form of muffler treated in accordance with my invention;

Fig. 23 is a section on line 23—23 of Fig. 22;

Fig. 24 is a longitudinal section illustrating one use of resonators with open ends in the practice of the invention;

Fig. 25 is an end view thereof;

Figs. 26, 27, and 28 are details showing methods of treating chambers with closed ends;

Fig. 29 is a diagram illustrating one method of treating a chimney;

Fig. 30 is a diagram illustrating one method of treating a chamber to prevent shock excitation thereof; and Figs. 31 to 34 are diagrammatic views showing particular applications of the invention to the exhaust pipes of internal combustion motors.

Referring first to Figs. 1 and 2, there is illustrated a tail pipe 1 coming from a muffler or other device 2 and having an open end at 3. The length of the pipe from the device 2 to the open end is indicated by L. Gas pulses within the device 2 may operate to cause the pipe to sound off at a frequency determined by the length L or at other frequencies which are harmonics thereof and are determined by other fractions of the pipe length. The pipe 1 when shock excited will set up various systems of standing waves, among them being the fundamental and various odd harmonics, for which there exists a region of maximum pressure change, or a so-called pressure anti-node, at the mid-point of the conduit. At this point a hole 4, having a specific size and preferably a specific structure to be described later, is located. Looking out from this hole the atmosphere is seen as a system offering substantially zero reactance and the effect of the coupling, provided that the hole is kept small, is to increase the damping within the tail pipe to the specified frequencies in the manner described above. The fundamental and odd harmonics thus eliminated generally comprise the bulk of the sound waves liable to be brought into being by shock excitation. By adding a second hole 5 at the quarter point the second, sixth, tenth, etc., harmonics will be eliminated. This will in general be sufficient, but in case the fourth harmonic proves to be important a third hole may be placed at a distance $$\frac{L}{8} \text{ or } \frac{3L}{8}$$

from the open end of the tube.

The described method of coupling is very effective in preventing the tail pipe from sounding off, but in the form shown has the difficulty common to slotted and perforated tail pipes in general of permitting the exit of gas at undesired points. In order to prevent this, the method of coupling illustrated in either Fig. 3 or Fig. 4 may be employed. In Fig. 3 the wall of the conduit 1 is stamped inwardly as shown at 6 forming a cup-like aperture 7 opening into the pipe along the direction of gas flow indicated by the arrow 8. An aspirating effect will thus be produced which will prevent passage of gas outwardly while preserving the necessary coupling for the sound waves. In Fig. 4 a nozzle 9, tipped as shown in the direction of gas flow, is similarly used.

The holes 4 and 5 are preferably made of a size between 3% and 20% of the internal diameter of the conduit. The size of the hole regulates the degree of the coupling with the auxiliary system formed by the atmosphere and, as stated above, the degree of the coupling is critical. If the values given are departed from in too great a degree the tendency to sound off under shock excitation from gas pulses is increased. Too small coupling renders the damping too small, the natural frequencies of the conduit remaining the same, and it is possible to cause the conduit to sound off at its natural frequencies. Too large a coupling results in changing the natural frequency of the conduit as can be seen from the fact that as the hole 4 is made large enough it will in effect cut the conduit 1 in two, and the composite system can be sounded off at these new frequencies.

In many cases it will be desirable to prevent even the minimum chance of gas passage presented by the holes 4 and 5 in the illustration above. For this purpose use is made of resonators either of the linear or volumetric type coupled to the main conduit through apertures of such small size that the resonators do not affect the natural frequencies of the main conduit. A form of device is shown in Figs. 5 and 6 which, although rather bulky, illustrates the principle of the more compact forms to be illustrated later. A main conduit 11 has an internal diameter D and a length L. Laterally disposed with respect to this conduit are three linear resonators 12, 13 and 14 closed at their outer ends and of lengths $$\frac{L}{2}, \frac{L}{4}, \frac{L}{8}$$

respectively. The resonators are acoustically coupled to the interior of the conduit 11 through restricted openings 15. The resonator 12, being of the closed type and of length $$\frac{L}{2}$$

is resonant for the fundamental and odd harmonics of the open conduit 11 of length L. For all of this series of frequencies there occurs a pressure anti-node or region of maximum pressure changes at the longitudinal mid-point of the conduit. The resonator 12 is coupled to the conduit at this mid-point. The second and sixth harmonics of the conduit 11 have regions of maximum pressure change at a distance $$\frac{L}{4}$$

from either end. The closed linear resonator 13 is positioned at such a point and being of length $$\frac{L}{4}$$

has natural frequencies corresponding to these harmonics. It is necessary to locate a resonator at only one of the quarter points. In a similar manner the resonator 14 takes care of the fourth and twelfth harmonics. It has been found that the resonators 13 and 14 should both be on the same side of the resonator 12 but, as will be shown in connection with Figs. 11 and 13, the shortest resonator may be on either side of the one of medium length. In practice it is not necessary to provide for more than the first seven harmonics unless the conduit being shock excited is very long and at the same time large enough in cross sectional area to produce these higher harmonics. In general the resonator 14 may be omitted, the fourth harmonic being usually unimportant.

The relation between the size of the openings 15 and the diameter of the main conduit is important. A hole of a definite size has a definite acoustic conductivity which has the dimensions of a length, and the conductivity of a round hole in thin material may be taken as equally numerically to the diameter of the hole. If holes of other shapes are used or if the coupling is through a nipple, other methods of finding the conductivity must be employed as will be understood by those skilled in the art. To avoid confusion, therefore, reference will be made to the conductivity $C_0$ of the holes 15 rather than to the diameter of the holes themselves.

I have found that optimum results are obtained when this conductivity $C_0$ is between 3% and 20% of the diameter of the conduit 11 and of not more than half the diameter of the resonator. The resonator itself may be made as large as desired but little advantage seems to flow from making it more than about a fourth of the diameter of the main conduit. If the conduit be annular the correct expression for the conductivity is 3% to 20% of the quantity $$\sqrt{\frac{4S}{\pi}}$$

where S is the cross sectional area of the conduit. As will readily be seen, this expression reduces to the diameter for a circular conduit and is therefore more general.

In the preceding examples the auxiliary system is an acoustical one depending upon the action of sound waves to produce the damping desired. A similar effect may be produced by mechanical means and two such devices are shown in Figs. 7 and 8. In Fig. 7 the wall 17 of the tail pipe or cavity to be treated is provided with an aperture 18 across which a diaphragm 19 is stretched, the diaphragm being preferably held in place by a cap member 20. By being closed in, the cap member at once prevents any danger of leakage and adds a desirable stiffness loading to the diaphragm. The diaphragm is designed in accordance with formulas which may be found in standard works on the theory of sound so that it has mechanical resonance for the frequency which it is desired to inhibit. To vary the resonance frequency of the diaphragm it may be loaded as by a weight 21. It will be understood that diaphragms of different frequency characteristics are located along the pipe at points corresponding to pressure nodes for the frequencies to which the pipe is sensitive as in the acoustical cases referred to above.

A similar mechanical device is shown in Fig. 8 in which the wall 23 is provided with an aperture 24 closed by a cap 25, the interior of which forms a cylinder. A piston 26 is slidably mounted in this cylinder and is pushed in opposite directions by springs 27 and 28. The differences in specific impedance between the gas in the conduit and the solid material of which the diaphragm or piston is made may be sufficient to reduce the coupling to the necessary degree. If not, the diameter of hole 24 may be made smaller, or an apertured plate 29 put on the inside of the conduit as in Fig. 7.

In Figs. 9 and 10 is shown a method of treating a tail pipe 30 by means of volumetric resonators 31 and 32. The resonator 31 is coupled to the conduit through a nipple 33, and the resonator 32 is coupled through a nipple 34. The conductivities of these nipples may be determined in accordance with standard formulas and should be kept within the ranges indicated above. The resonator 31, which is located at the midpoint of the conduit, has a volume $V_1$ sufficient to tune it to the fundamental of conduit 30, taking into account the effect of the conductivity 33. This prevents sounding off of the fundamental frequency, but, due to the character of volumetric resonators, does not take care of the harmonics as a linear resonator would do. The second resonator 32 has a volume $$\frac{V_1}{4}$$

and is positioned at the quarter point so as to inhibit the formation of the second harmonic of the conduit 15. This type of device is useful in the case of short conduits wherein the production of higher harmonics by shock excitation is unlikely or unimportant.

Figs. 11 to 15 illustrate simple and practical means for applying the principles of Fig. 5 to ordinary conduits and have a wide range of possible application. In Figs. 11 and 12 the conduit 37 is provided with a tube 38 closed at its ends and provided with intermediate partitions 39 and 40 at the half and quarter points of the main channel, respectively. The tube is taken of a length equal to seven-eighths of the channel and is provided with small openings 41, 42 and 43 leading into the chambers 44 of length $$\frac{L}{2}$$

45 of length $$\frac{L}{4}$$

and 46 of length $$\frac{L}{8}$$

respectively. The necessary size of the tube has been somewhat exaggerated in the drawings for clearness, it having been proved by experiment that even a very small tube is quite effective provided that its ratio of diameter to length is not so small as to introduce serious frictional losses.

A somewhat similar structure is shown in Figs.

13 and 14. In this case the pipe 50 is provided with an internal tube 51 of the same length as the pipe and closed at its ends. No internal partitions are used in this case, the tube being provided merely with small holes 52 and 53 located at the half and quarter points respectively. On account of the simplicity of construction and the small size of this apparatus it is extremely satisfactory in any case where the pipe is of a sufficient size so that the diminution of cross-sectional areas occasioned by the introduction of the small tube does not seriously impair its gas carrying capacity. As mentioned above, even a small tube is very efficient in inhibiting a tendency of the pipe to sound off. For example, I have found that a ten-inch pipe can be treated adequately with a small tube of the type shown in Fig. 13 having a diameter of two inches or even less.

It should be pointed out that the holes should have conductivities within the range indicated above. While the two holes are generally sufficient, an additional hole 54 at a distance equal to $$\frac{3L}{8}$$

from the open end of the tube may be used if desired. If so, the holes must be located in such a way that they do not interfere with each other. For example, it is possible to locate the hole 54 on the other side of hole 53 as indicated at 54' in Fig. 15 (or at a distance $$\frac{L}{8}$$

from the tube end), but it would not be possible to place it on the other side of hole 52 as this would not leave any clear length of tube of a length $$\frac{L}{2}$$

Apparently, in the preferred form shown in Fig. 13, the device acts as if having a resonator extending to the left of hole 52 with one open and one closed end; a similar resonator half as long extending to the right of hole 53; and a resonator with two open ends between the holes 52 and 53. The latter resonator is of length $$\frac{L}{4}$$

but as it has two open ends has response frequencies similar to a resonator of length $$\frac{L}{8}$$

with one closed end, like the resonator 14 in Fig. 5. The action where an additional hole 54 is used is more obscure. It may be pointed out that while the location of the different holes and resonators given should preferably be adhered to, a variation of several per cent may appear in practice without permitting standing waves to appear.

Figs. 16 and 17 indicate another method of accomplishing a similar result where the initial diameter of the pipe is not sufficient to permit any of its cross-sectional area to be sacrificed. The conduit 55 is in this case provided with an external tube 56 coupled to it at suitable points by small holes 57.

Figs. 18 and 19 show a method of applying volumetric resonators to a conduit which is generally preferable in practice to the form shown in Fig. 9. In this case an annular chamber 60 is secured externally of the main conduit 61 and is coupled thereto through holes 62. This type of device is at once more compact and more rigid than where side coupled chambers are used.

In Figs. 20 and 21 I have indicated the application of the principles of my invention to the silencing of an expansion chamber and a tail pipe leading therefrom. This structure will serve as an example by which similar problems may be treated. It will be understood that the specific mechanical construction is intended as illustrative only. In any case where a resonator or expansion chamber has a sufficient ratio of length to diameter there is a tendency toward the formation of longitudinal standing waves under shock excitation. The nature of these waves depends upon other circumstances, particularly the relation between the diameter of the chamber and the diameter of the inlet and outlet pipes. If the pipes are large with respect to the chamber the latter resonates as a pipe having open ends, and pressure anti-nodes will occur at the half, quarter, and eighth points. If the pipes are smaller the chamber will resonate as a pipe with closed ends and there will be a series of pressure anti-nodes including one at each end. The points of coupling of the auxiliary system should therefore be chosen in view of the particular case being treated, and the form shown is illustrative only.

In the embodiment shown, an expansion chamber 64 is connected to an inlet conduit 65 and to an exhaust conduit 66. Within the expansion chamber are two longitudinal extending curved plates 67 welded in place and provided with lateral openings 68 located at the pressure anti-nodes for the frequencies at which the expansion chamber has a tendency to set up longitudinal standing waves. Within the tail pipe 66 is a tube 69 of the type shown in Fig. 13 slidably supported on one end by clips 70 and held at the other end by clips 71.

Figs. 22 and 23 show the application of the principles of the invention to a type of silencing device comprising a chamber 75 divided into compartments by a transverse partition 76. An inlet pipe 77 leads into one of the chambers 76 thus formed and an outlet pipe 80 leads out of the other. The inlet and exhaust pipes have lateral escape openings 81 in the form of a slot or perforations. An open ended tube 82 extends between the two chambers 76 and 89, passing through the partition 76. Supported within this tube as by clips 83 is a small tube 84 constructed, as shown, in accordance with Fig. 15. The perforations 85 in this tube are positioned as described above to prevent any series resonance phenomena within the pipe 82. Instead of having the pipe 82 overlapping the conduits 77 and 80, these pipes may end at the same point in accordance with the teaching of my co-pending application, Serial No. 290,353, filed August 16, 1939.

Another method of the applying of the teachings of this invention to a conduit acoustically open at both ends is shown in Figs. 24 and 25 in which the conduit 90 of length L has disposed interiorly therein a tubular member 91 also of length L and a concentric tubular member 92 of length $$\frac{L}{2}$$

These members are held in concentric relation in any desired way as by rods 93 welded in place. There are thus formed annular passages 94 and 95 and a central tubular passage 96 the sum of which substantially equals the area of the passage of the main conduit 90, it being understood that the dimensions of the various conduit walls are greatly exaggerated in the drawings.

In this case, open rather than closed tubular resonators have been used. The diameters of these open resonators are such that the proper coupling exists between them and the interior of the conduit with which they are associated. For instance, the diameter of the member 91 is preferably made about one-quarter of the diameter of the main conduit 90. The area of the annular passage 95 is made somewhat smaller than the area of the passage 96, partly because the area of the main conduit at the point where the annular passage is coupled thereto is smaller and partly because the conductivity of the annular slot formed by the end of the passage-way 95 is larger for a given cross-sectional area than it would be if of circular instead of annular section. While the member 91 has the same natural frequencies as the conduit 90, it only takes care of the fundamental and odd harmonics, since the interiorly disposed end of the member 91 is located at pressure anti-nodal points for these frequencies only. It is consequently necessary to provide the member 92 of length $$\frac{L}{2}$$

to prevent the formation of the second harmonic. The second harmonic does not pass through the conduit 91 because it is coupled with the conduit 90 at a pressure nodal point for that harmonic. I have found that this arrangement is very effective in preventing the formation of shock excited waves in the tail pipe and is very efficient since the resonators are also passageways for the gas.

The principles of the invention may also be applied to prevent shock excitation of resonant devices which do not necessarily conduct exhaust gas from an internal combustion engine. Fig. 26 shows a simple closed linear resonator 97 having an interiorly disposed closed tubular resonator 98 with its open end in adjacency to the closed end of resonator 97 and acoustically coupled thereto through the acoustical conductivity 99. I have shown this conductivity as being formed by the annular slot between the end-header 100 and the open end of the resonator 98. In this case the resonator 98 is supported on suitable brackets 101.

Instead of forming the conductivity by an annular slot the resonator 98 may be extended up to the wall 100 and welded in place as shown in 102 in Fig. 27. Coupling in this case is obtained through one or more laterally extending holes 103. The value of the conductivity in either of the two preceding cases is of the same order as discussed above. It will be seen that the natural frequencies of both resonators are the same and that there will be a pressure anti-node for every possible natural frequency of the resonator 97 at its closed end. Therefore but one damping resonator is necessary. Similar remarks may apply to the expansion chamber 64 in Fig. 20 if its dimensions relative to the inlet and exhaust conduits are such as to produce pressure anti-nodes at the ends.

Instead of locating the resonator within the pipe 97, it may be located exteriorly thereof as shown in Fig. 28, coupling in this case being had through a small hole 104 formed in the end-header 100.

Fig. 29 shows in diagrammatic form another application of the principles of the invention. Many gun type oil burners used for heating purposes shock excite the chimney flues used to carry off the produce of combustion, causing a low frequency roar that is very objectionable. In the diagram the flue 110 carries to the atmosphere the gases from the heater 111 through flue pipe 112. A resonator tube 113 closed at its upper end and open at the bottom end is made of such a length that its natural frequencies correspond to those of the flue 110. It may be jointed for ease of insertion in installation and is located by being lowered down the chimney. The lower end of the resonator tube may be coupled to the interior of the flue through a hole 114 or held spaced from the bottom of the flue as in Fig. 26. Since this roar is strictly a shock excited phenomenon the device is very effective.

Fig. 30 shows a chamber 115 having a volume V and a conductivity $C_0$ at its entrance formed by an aperture 116. Under suitable conditions this chamber may act as a resonator by shock excitation through the conductivity 116. To prevent this an auxiliary resonating chamber 117 is coupled thereto through a hole 118. If the auxiliary resonator is chosen with a volume $$\frac{V}{4}$$

and a conductivity $$\frac{C_0}{4}$$

the combination is highly efficient in preventing shock excited resonators within the chamber 115. This principle may be applied to the combustion chamber of an oil fired furnace effectively reducing the tendency to roar. By combining the treatments shown in 29 and 30 an extremely quiet system is obtained.

Figs. 31 to 34 inclusive illustrate different applications of the invention to the exhaust line of an internal combustion engine. Particularly with single cylinder, two cycle engines there is a strong tendency for the force of the explosion to set up standing waves in the exhaust line which continue after the exhaust port has been closed. Due to the physical dimensions of the exhaust line, these sound waves are of relatively low pitch and require a larger silencer than it would take to silence the noise actually coming out of the exhaust port. In Fig. 31 the cylinder of the engine is shown at 120 and the exhaust line at 121. After the closure of the exhaust port the exhaust line is closed at its inner end, and its treatment is the same as in Figs. 26 to 29. A tube 122 is shown as connected to the exhaust line near the exhaust port through a small opening 123. This arrangement will not silence the noise of the exhaust, but it will prevent the setting up of sound waves due to resonance in the exhaust pipe itself.

In Fig. 32 the same arrangement of parts is shown with the exception that a muffler 124 is added in the exhaust line. This muffler may, if desired, be constructed as described in my patent 2,043,731, June 9, 1936, which shows a muffler having a straight through passage of the same size as the tail pipe. The introduction of a muffler in the exhaust line has the effect of changing the resonant frequencies of the exhaust line or, to phrase it differently, changes its effective length. In this case the closed end pipe 122 should have its length chosen to produce the same series of frequencies as occur in the exhaust pipe and it is not necessarily made of the same length as that pipe as in the cases previously discussed.

Fig. 33 shows a small muffler 125, which may be constructed in accordance with the teachings of the patent referred to, coupled to the exhaust line 121 adjacent to the exhaust port. This functions somewhat if the holes directly open to the atmosphere discussed in connection with Fig. 1. By locating a small muffler at this point or by using the pipe 122 as described above, a considerable reduction in the necessary size of the muffler to be placed in the exhaust line may be obtained. This is for the reason that the small muffler prevents the formation of standing waves in the exhaust line and since these waves are generally lower in frequency than those present directly in the exhaust, it is not necessary to provide for a muffler reaching down to the lower frequencies.

In Fig. 34 are shown two cylinders 130, the exhaust lines 131 of which form a Y run into a common exhaust line 132. Adjacent the exhaust ports a small pipe 133 is mounted between the two branches 131, this pipe having a muffler offering an acoustic resistance placed in it. By this construction both lines are kept being shock excited.

I claim:

1. A device for preventing shock excitation of an acoustic enclosure having at least one pressure anti-nodal point comprising a mechanical oscillator exposed to said enclosure at one of said points and tuned to resonate at a frequency for which said point is a pressure anti-node.

2. A device for preventing shock excitation of an acoustic conduit and which has at least one natural pressure anti-nodal point comprising an opening to the atmosphere localized at each of said points and of a diameter from 3% to 20% of that of the conduit.

3. A device for preventing shock excitation of an acoustic enclosure comprising at least one resonator individually acoustically coupled to said enclosure at a natural pressure anti-node for a frequency equal to a resonant frequency of said resonator, the conductivity of said coupling having a value between 3% and 20% of the average diameter of said enclosure.

4. A device for preventing shock excitation of an acoustic enclosure comprising at least one linear resonator individually acoustically coupled to said enclosure at a natural pressure anti-node for a frequency equal to a resonant frequency of said resonator, the conductivity of said coupling having a value between 3% and 20% of the average diameter of said enclosure.

5. A device for preventing shock excitation of an acoustic enclosure comprising at least one volumetric resonator acoustically coupled to said enclosure at a natural pressure anti-node for a frequency equal to that of said resonator, the conductivity of said coupling having a value between 3% and 20% of the average diameter of said enclosure.

6. A uniform acoustic conduit wherein standing waves may occur, said conduit being acoustically open at each end, a closed linear resonator acoustically coupled thereto at a point midway along its length through an acoustic conductivity having a value of 3% to 20% of the average diameter of said conduit.

7. A device for preventing shock excitation of an open conduit of uniform circular cross-sectional area throughout its length, comprising at least one resonator acoustically coupled to the conduit at a distance from the open end thereof equal to an integral odd number of quarter wave-lengths of a common natural frequency of said resonator and of said conduit, the acoustic conductivity of said coupling having a value between 3% and 20% of the diameter of said conduit.

8. An acoustic conduit open at both ends, wherein standing waves may be elicited by shock excitation, an interiorly and co-axially disposed closed linear resonator having a natural response frequency equal to a natural frequency of said standing wave system, said resonator being acoustically coupled to said conduit at a point of maximum pressure change for said frequency through an acoustic conductivity having a value between 3% to 20% times $$\sqrt{\frac{4S}{\pi}}$$

where S is the cross-sectional area of the conduit.

9. An acoustic conduit of length L having interiorly disposed therewithin a co-axial tubular member closed at both ends, the interior space of which is divided into three linear compartments by means of transverse headers, said compartments having lengths substantially equal to $$\frac{L}{2}, \frac{L}{4} \text{ and } \frac{L}{8}$$

respectively, and apertures at corresponding ends of said compartments whereby are formed acoustic conductivities which couple the three resonators to the conduit at points along thereof equal to a distance of $$\frac{L}{2}, \frac{3L}{4} \text{ and } \frac{7L}{8}$$

from an open end of said conduit, the conductivities each having a value between 3% and 20% times $$\sqrt{\frac{4S}{\pi}}$$

where S is the cross-sectional area of the conduit.

10. An annular acoustic conduit formed between two concentric tubular members of equal length, the inner member being closed at both ends and provided with an aperture in the wall thereof at a point midway along its length.

11. A conduit acoustically open at both ends and having one or more apertures in the wall thereof at a point substantially midway along its length, the acoustical conductivity of all the apertures at said point having a value between 3% and 20% times $$\sqrt{\frac{4S}{\pi}}$$

S being the cross-sectional area of the conduit.

12. A conduit acoustically open at both ends wherein shock excited standing waves may occur, one or more closed linear resonators disposed within said conduit parallel to the axis thereof, said resonators having natural frequencies corresponding to the natural frequencies of the conduit and acoustically coupled thereto at pressure anti-nodal points of the standing wave system in said conduit through apertures having an acoustical conductivity lying between 3% and 20% times $$\sqrt{\frac{4S}{\pi}}$$

S being the cross-sectional area of the conduit.

13. An annular acoustic conduit formed between two concentric tubular members of equal length, the inner member being closed at both ends and provided with coupling apertures each having an acoustical conductivity lying between 3% and 20% times $$\sqrt{\frac{4S}{\pi}}$$

S being the cross-sectional area of the conduit, said apertures being positioned along the length of said inner member at distances equal to one-half, three-quarters and seven-eighths the length of said conduit measured from one open end thereof.

14. An annular acoustic conduit formed between two concentric tubular members of equal length, the inner member being closed at both ends and provided with coupling apertures each having an acoustical conductivity lying between 3% and 20% times $$\sqrt{\frac{4S}{\pi}}$$

S being the cross-sectional area of the conduit, said apertures being positioned along the length of said inner member at distances equal to one-half, five-eighths, and three-quarters of the length of said conduit measured from one open end thereof.

15. An acoustic conduit wherein may be excited a system of standing waves, apertures at points along the length of said conduit at regions of maximum pressure change therein, said apertures communicating with the interior of an elongated casing, disposed exteriorly, laterally and parallel to the axis of said conduit, said casing being closed at both ends and having the same length as the conduit, said apertures each having conductivities of the order of 3% to 20% times $$\sqrt{\frac{4S}{\pi}}$$

S being the cross-sectional area of said conduit.

16. An acoustic conduit open at both ends and a volumetric resonator acoustically coupled thereto at a point midway along its length, the acoustic conductivity of said coupling resonator having a value between 3% and 20% times $$\sqrt{\frac{4S}{\pi}}$$

S being the cross-sectional area of the conduit.

17. An acoustic conduit open at both ends, volumetric resonators acoustically coupled thereto at points midway of the length of the conduit and one-fourth of the distance from the open end of said conduit respectively, the acoustic conductivity of said coupling having a value between 3% and 20% of $$\sqrt{\frac{4S}{\pi}}$$

where S is the cross-sectional area of the conduit.

18. In combination with a muffler, a tail pipe extending from the muffler and opening to the atmosphere, and one or more linear resonators with closed ends acoustically coupled to the tail pipe, the length of the resonators being taken consecutively from the series $$\frac{L}{2}, \frac{L}{4}, \text{ and } \frac{L}{8}$$

where L is the length of the tail pipe, and the distance of its coupling points from one end of the tail pipe being taken consecutively from the series $$\frac{L}{2}, \frac{L}{4}, \text{ and } \frac{mL}{8}$$

where $m$ is an odd integer less than 5, the conductivity of said coupling being between 3% and 20% of the quantity $$\sqrt{\frac{4S}{\pi}}$$

where S is the cross-sectional area of the gas passage within the tail pipe.

19. A device for preventing shock excitation of an acoustic conduit comprising a tube with closed ends inserted in and longitudinally coextensive with the conduit, said tube having one or more holes therein located at distances from one end of the tube taken consecutively from the series $$\frac{L}{2}, \frac{L}{4}, \text{ and } \frac{mL}{8}$$

where L is the length of the conduit and $m$ is an odd integer less than 5, the conductivity of said holes being between 3% and 20% of the quantity $$\sqrt{\frac{4S}{\pi}}$$

where S is the cross-sectional area of the conduit less the cross-sectional area of the tube.

20. A device for preventing shock excitation of an acoustic conduit comprising a tube with closed ends inserted in and longitudinally coextensive with the conduit, and having a diameter of the order of $$\frac{1}{2}\sqrt{\frac{S}{\pi}}$$

where S is the cross-sectional area of the conduit, said tube having one or more holes therein located at distances from one end of the tube taken consecutively from the series $$\frac{L}{2}, \frac{L}{4}, \text{ and } \frac{mL}{8}$$

where L is the length of the conduit and $m$ is an odd integer less than 5, the conductivity of said holes being between 3% and 20% of the quantity $$\sqrt{\frac{4S}{\pi}}$$

where S is the cross-sectional area of the conduit less the cross-sectional area of the tube.

21. In a muffler having two compartments and an open-ended conduit connecting said compartments, an acoustic resonator acoustically coupled to said conduit at a point of maximum pressure change for a standing wave system therein, and tuned to resonate at the frequency of said system, the conductivity of said coupling having a value between 3% and 20% times $$\sqrt{\frac{4S}{\pi}}$$

where S is the cross-sectional area of the conduit.

22. An acoustic conduit comprising three nested open-ended tubes of relative lengths L, L and $$\frac{L}{2}$$

starting with the outside tube; the mid-points of the two inner nested tubes being opposite an end of the outer tube, and the cross-sectional areas of the passages formed respectively by the inner tube and by the space between the inner and intermediate tube being of the order of one-sixteenth the cross-sectional area of the conduit at the point where they are coupled thereto.

23. An open ended resonance tube having acoustically coupled thereto at its midpoint an open ended resonance tube of the same length and of about one-sixteenth the cross-sectional area thereof.

24. A closed resonance tube having acoustically coupled thereto at its closed end a closed linear resonance tube of the same length, the conductivity of the coupling aperture having a value between 3% and 20% times $$\sqrt{\frac{4S}{\pi}}$$

S being the cross-sectional area of the main resonance tube.

25. A pair of nested tubes of equal length, the inner tube being closed at the opposite end from the closed end of the outer tube, the opening between the open end of the inner tube and the interior of the outer tube having a conductivity between 3% and 20% times $$\sqrt{\frac{4S}{\pi}}$$

S being the area of the annular channel thus formed between said tubes.

26. A linear resonator of the closed type having a tubular member of equal length and closed at both ends co-axially inserted therein for its full length, an aperture at the inner end of said tubular member having an acoustical conductivity between 3% and 20% times $$\sqrt{\frac{4S}{\pi}}$$

S being the cross-sectional area of the space between the outside of said tubular member and the inside of said resonator.

27. A volumetric resonator having a second volumetric resonator of the same natural frequency acoustically coupled thereto, the conductivity of the second named resonator being of the order of one-fourth the conductivity of the first named resonator.

28. A device for preventing shock excitation of a chimney flue comprising a tube having a cross-sectional area of the order of one-sixteenth the area of the chimney flue, said tube extending throughout the length of the chimney and being closed at its top, the bottom of the tube being acoustically coupled to the space within the flue, the conductivity of the coupling being sufficiently low to cause no substantial change in the natural resonance frequencies of the flue.

29. A device for preventing shock excitation of the combustion chamber of a furnace comprising a chamber having a volume of the order of one-fourth that of the combustion chamber and coupled thereto through a conductivity of the order of one-fourth that of the outlet opening of the combustion chamber.

30. In combination with an internal combustion motor, an exhaust line running from the exhaust port thereof and an auxiliary system of substantially zero reactance coupled to the exhaust line adjacent the exhaust port.

31. In combination with an internal combustion motor, an exhaust line therefor and a closed pipe of the same effective length as the exhaust line coupled to the exhaust line adjacent the exhaust port through a conductivity sufficiently small so that the exhaust line and said pipe do not resonate together as one system.

32. In combination with an internal combustion motor, an exhaust line therefor and a silencing device presenting an acoustic resistance coupled to said exhaust pipe adjacent the exhaust port.

33. In combination with an internal combustion motor, an exhaust line therefor, a muffler in said line and a second muffler having one end connected to the exhaust line adjacent to the exhaust port.

34. In combination with an internal combustion motor having two cylinders, an exhaust line from each of said cylinders merging into a common exhaust line, a pipe connecting the two branches adjacent the exhaust ports of the two cylinders and a silencing device in said pipe presenting an acoustic resistance.

ROLAND B. BOURNE.